US008638460B2

(12) United States Patent  (10) Patent No.: US 8,638,460 B2
Shima  (45) Date of Patent: Jan. 28, 2014

(54) DATA TRANSFER DEVICE, IMAGE PROCESSING APPARATUS, AND RECORDING MEDIUM

(75) Inventor: Tomohiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 12/929,988

(22) Filed: Mar. 1, 2011

(65) Prior Publication Data

US 2011/0222111 A1 Sep. 15, 2011

(30) Foreign Application Priority Data

Mar. 10, 2010 (JP) ................................ 2010-052959

(51) Int. Cl.
*G06F 3/12* (2006.01)
(52) U.S. Cl.
USPC .......... 358/1.15; 358/1.14; 358/1.13; 710/52; 710/313; 710/314; 710/316
(58) Field of Classification Search
USPC ......... 358/1.15, 1.13, 1.14; 710/52, 313–314, 710/316
See application file for complete search history.

(56) References Cited

U.S. PATENT DOCUMENTS

| 7,702,841 | B2 | 4/2010 | Shima | |
|---|---|---|---|---|
| 2006/0132490 | A1* | 6/2006 | Kwak et al. | 345/503 |
| 2007/0239925 | A1 | 10/2007 | Koishi | |
| 2009/0138647 | A1* | 5/2009 | Hagita | 710/316 |
| 2011/0010481 | A1* | 1/2011 | Hamadani et al. | 710/313 |

FOREIGN PATENT DOCUMENTS

| JP | 2006-133895 | 5/2006 |
|---|---|---|
| JP | 2007280237 A | 10/2007 |
| JP | 2009176294 A | 8/2009 |
| JP | 2009-259217 | 11/2009 |

OTHER PUBLICATIONS

Office Action for corresponding Japanese Application No. 2010-052959 dated Oct. 1, 2013.

* cited by examiner

*Primary Examiner* — Jacky X Zheng
(74) *Attorney, Agent, or Firm* — Harness, Dickey & Pierce

(57) ABSTRACT

A data transfer device includes a serial interface including plural transmission paths and carrying out a data transfer operation with plural operating frequencies, transfer requesting units issuing a data transfer request to the serial interface, a request monitoring unit, a condition setting unit setting a set transmission path condition including at least one of a number of the transmission paths and an operating frequency used when the data transfer requests are issued to switch statuses of the data transfer requests to statuses of switching data transfer requests, a use transmission path condition determining unit determining the set transmission path condition corresponding to the status of the switching data transfer request as a use transmission path condition when the status of switching data transfer request corresponds to the status of data transfer request by comparing the statuses, and a switching unit switching to the use transmission path condition.

8 Claims, 5 Drawing Sheets

DATA TRANSFER DEVICE, IMAGE PROCESSING APPARATUS, AND RECORDING MEDIUM

BACKGROUND OF THE INVENTION

1. Field of the Invention

The present invention generally relates to a data transfer device, image processing apparatus, data transferring program, and recording medium, and more specifically, a data transfer device, an image processing apparatus, a data transferring program, and a recording medium including a serial interface for communicating via plural transmission paths.

2. Description of the Related Art

In image forming apparatuses such as a copier, a facsimile machine, a printer, and a multifunction peripheral, image data for main scanning lines are required to be transferred from an image processing unit to an image forming unit and when the transferred data are not transferred on time an image formed by the image forming unit may become abnormal.

Recently, example image forming apparatuses carry out various data processing under a control of a Central Processing Unit (CPU) of a semiconductor integrated circuit such as an Application Specific Integrated Circuit (ASIC) having plural functional modules installed in the image forming apparatus, and a Peripheral Component Interconnect Express (PCI) express being a high speed split transaction bus which can issue a request without waiting for a response which is separated from the requests is used.

In this PCI Express, the link width and the data rate (2.5 GT/s or 5.0 GT/s) are designed so that the data transfer does not become imperfect even if the maximum frequency band is required for presumed data transfers.

In second generation standard called Gen2 of the PCI Express, it is possible to select one of operating frequencies 2.5 GT/s and 5.0 GT/s of a transmission path or change a link width after a link-up. Under this standard, there are permitted link widths of ×1, ×2, ×4, ×8, ×12, ×16, and ×32.

A transmission path connected by the PCI Express in point-to-point connects devices located on both ends of the transmission path in a protocol hierarchy of the data link layer and lower without interposing software. A connection between the devices on the both ends of the PCI Express is established with the maximum link width among the link widths usable by the devices.

However, the transmission path using the PCI Express is constantly operated in the installed link width and operating frequency. Therefore, in cases other than a case where the greatest frequency band is required, the transmission path is operated with redundant link width and operating frequencies thereby causing useless power consumption. Especially, the PHY of the PCI Express is operated at a very high rate (2.5 GHz/5 GHz) in comparison with the operating frequency (about 100 MHz) inside the ASIC. Because the power consumption is proportional to the frequency, the operating condition largely effects on the power consumption.

For example, when the PCI Express is set such that the link width is ×4 and the operating frequency is 5 GT/s, the PCI Express is operated under the link width of ×4 and the operating frequency of 5 GT/s even if a data transfer does not require the frequency band such as a simple data access.

As described, it is unavoidable to increase the number of lanes more and make the operating frequency higher as the speed of the image forming apparatus increases more. Therefore, the reduction of the power consumption of circuits related to the PCI Express has great importance in reducing the power consumption of the entire image forming apparatus.

Therefore, there is proposed, in Patent Document 1, a technique that the electrical power is saved by changing an interface with a reading unit in an electrical power saving mode until there arrives a read command from the reading unit. After applying the Patent Document 1 to the PCI Express, it is possible to save energy in an idle state in which a data transfer is not carried out.

However, in Patent Document 1, the interface is set to the idle state causing no data transfer and the link width and the operating frequency are not considered. Therefore, even when data transfer is sufficiently possible while the data transfer is generating, the device on the both ends of the PCI Express has the maximum link width and the connection if established at the maximum operating frequency. Therefore, further electrical power saving is possible.

In the PCI Express of the second generation standard, it is possible to select the data rate of 2.5 GT/s or 5.0 GT/s of the transmission path and change the link width by setting a configuration register. When the register is set by a software control, a processing time of software necessary for the Configuration register becomes relatively large in comparison with an operating time of hardware and it does not processes in real time. Therefore, data transmission may be troubled.

Patent Document 1: Japanese Laid-Open Patent Application No. 2009-176294

SUMMARY OF THE INVENTION

Accordingly, embodiments of the present invention may provide a novel and useful data transfer device, image processing apparatus, a data transferring program, and a recording medium, solving one or more of the problems discussed above. More specifically, the embodiments of the present invention may promptly adjust the link width and operating frequency to have values suitable for the data transfer request while the data are transferred.

One aspect of the embodiments of the present invention may be to provide a data transfer device including a serial interface configured to include a plurality of transmission paths and carry out a data transfer operation with a plurality of operating frequencies, a predetermined number of transfer requesting units configured to issue a data transfer request to the serial interface, a request monitoring unit configured to monitor the data transfer request from the predetermined number of transfer requesting units to the serial interface, a condition setting unit configured to set a set transmission path condition including at least one of a number of the transmission paths and an operating frequency of the serial interface, which is used when the data transfer requests are issued in order to switch statuses of the data transfer requests to statuses of switching data transfer requests, a use transmission path condition determining unit configured to determine the set transmission path condition corresponding to the status of the switching data transfer request as a use transmission path condition when the switching data transfer request corresponds to the status of the data transfer request by comparing the status of the data transfer request with the status of the switching data transfer request; and a switching unit configured to switch at least one of the number of the transmission paths and the operating frequency of the serial interface to the use transmission path condition determined in the use transmission path condition determining unit.

Another aspect of the embodiments of the present invention may be to provide an image processing apparatus including a data transfer device including: a serial interface configured to include a plurality of transmission paths and carry out a data transfer operation with a plurality of operating frequencies; a predetermined number of transfer requesting units configured to issue a data transfer request to a serial interface; a request monitoring unit configured to monitor the data transfer request from the predetermined number of transfer requesting units to the serial interface; a condition setting unit configured to set a set transmission path condition including at least one of a number of the transmission paths and an operating frequency of the serial interface, which is used when the data transfer requests are issued in order to switch statuses of the data transfer requests to statuses of switching data transfer requests; a use transmission path condition determining unit configured to determine the set transmission path condition corresponding to the status of the switching data transfer request as a use transmission path condition when the status of the switching data transfer request corresponds to the status of the data transfer request by comparing the status of the data transfer request with the status of the switching data transfer request; and a switching unit configured to switch at least one of the number of the transmission paths and the operating frequency of the serial interface to the use transmission path condition determined in the use transmission path condition determining unit; and a data processing device that processes the data transferred from the data transfer device to the data processing device.

Another aspect of the embodiments of the present invention may be to provide a non-transitory recording medium saving a program representing a sequence of instructions, the program which when executed by a computer included in an data transfer device including a serial interface which is connected to plural transmission paths, the instructions including steps of: processing a predetermined number of data transfer requests to the serial interface and carries out data transfer operations with plural operating frequencies; monitoring the data transfer request to the serial interface in the processing; setting a set transmission path condition including at least one of a number of the transmission paths and an operating frequency to be used under statuses of the plural data transfer requests, the set transmission path condition being obtained by associating the plural data transfer requests with a status of a switching data transfer request; determining the set transmission path condition corresponding to the status of the switching data transfer request as a use transmission path condition when the status of the switching data transfer request corresponds to the status of the data transfer request by comparing the status of the data transfer request with the status of the switching data transfer request; and switching at least one of the number of the transmission paths and the operating frequency of the serial interface to the use transmission path condition determined in the determining.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

A description is given below, with reference to the FIG. 1 through FIG. 5 of embodiments of the present invention.

Reference symbols typically designate as follows:
1: Image forming apparatus;
2: Printer;
3: ASIC;
4: MCH;
5: CPU;
6: Memory;
7: ICH;
HS: Host apparatus;
10: PCI Express;
21: Plotter I/F circuit;
21a-24a: DMAC;
22,23: Compression and extension circuit;
24: Image rotating circuit;
25: Arbiter;
26: DMAC monitor circuit;
27: Request mask circuit;
28: Clock generating circuit;
29: PCI Express I/F circuit;
29a: Link layer;
29b: PHY;
29c: Retry buffer;
31: Link condition requesting circuit;
32: Link condition switching request circuit;
33: Switching enable register;
R_1-R_4: Register; and
Hk: Judgment circuit.

Embodiment 1

Figure 1:
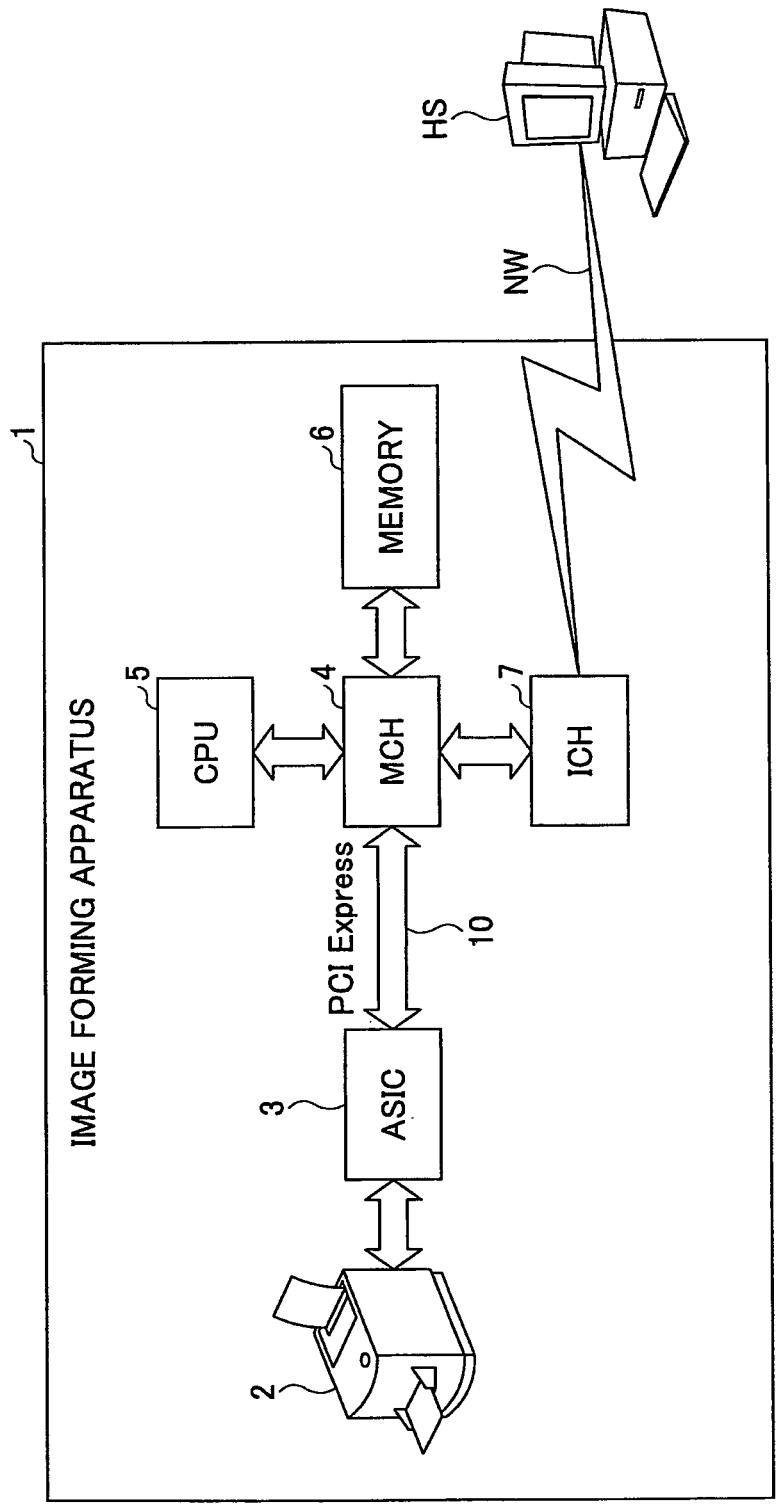
FIG. 1 is an example block chart of an image forming apparatus of an Embodiment.

FIG. 1 to FIG. 5 illustrates a data transfer device, image processing apparatus, a data transferring program, and a recording medium of Embodiment 1. FIG. 1 illustrates an example block chart of an important portion of image forming apparatus 1 to which the data transfer device, the image processing apparatus, the data transferring program, or recording medium of Embodiment 1 is applied.

Referring to FIG. 1, the image forming apparatus 1 includes a printer 2, an application specific integrated circuit (ASIC) 3, a memory controller hub (MCH) 4, a central processing unit (CPU) 5, a memory 6, I/O controller hub (ICH) 7, an I/O ASIC (not illustrated), a hard disk (not illustrated), an operations display unit (not illustrated), or the like.

The ASIC 3 functions as the data transfer device. The data transfer device 3 is connected to the CPU 5, the memory 6 and the ICH 7 via the MCH 4, controls transfer of image data among the CPU 5, the memory 6, and the ICH 7, and controls driving of the printer 2 under a control with the CPU 5.

The memory 6 is connected to the CPU 5 via the MCH 4. The memory 6 is formed by a random access memory (RAM) of the like. The memory 6 stores data, programs, descriptors or the like of the image data to be processed under a control of the CPU 5. The program is a basic program for the image forming apparatus 1 and a data transfer program for efficiently carrying out a data transfer method of efficiently data transfer with the PCI Express of Embodiment 1. The program may be stored not only in the memory but also in a hard disk or the like.

The CPU 5 carries out a basic process as the image forming apparatus 1 and the data transfer method of Embodiment 1 by controlling various portions of the image forming apparatus 1 based on the program of the image forming apparatus 1 stored in a read only memory (ROM) (not illustrated) or the data transfer program.

The ICH 7 is connected to the MCH 4 and further connected to the host apparatus HS via the network NW. The ICH 7 is connected to the host apparatus HS via the MCH 4 and the network.

The operations display unit (not illustrated) is connected to the ICH 7. The operations display unit includes various keys such as numerical keypads and a start key and a display such as a liquid crystal display. Various commands such as a print command are provided from the operations key. The commands input from the operations keys and various information for reporting a user from the image processing unit are displayed on the image forming apparatus 1.

The MCH 4 is connected to the ASIC 3, the CPU 5, the memory 6 and the ICH 7. Data and signals are exchanged between these portions.

Especially the MCH 4 and the ASIC 3 are connected by the PCI Express 10 and carries out a high speed data transfer.

The ASIC 3 provides a necessary image processing to the received image data. The processed image data are stored in the memory 6. The image data stored in the memory 6 are read at a predetermined timing and provided with necessary image processing. The processed image data are transferred to the printer 2 thereby being printed by the printer 2.

The printer receives the image data (print data) sent from the host apparatus HS connected via the network HS via the ASIC 3. The received image data are printed by the printer 2 with a predetermined image forming method such as an electrophotographic method and an inkjet method.

The CPU 5 of the image forming apparatus 1 renders an image based on the image data (print data) of page description language (PDL) received via the network from the host apparatus when the printer works. The rendered image data are stored in the memory 6. Thereafter, the DMAC of the ASIC 3 reads the rendered image data from the memory 6 and sends the read image data to the printer 2. Then, the printer 2 prints the image on a paper based on the image data.

The image forming apparatus 1 reads the data transfer program of Embodiment 1 which is recoded in a computer-readable recording medium such as a ROM, an Electrically Erasable and Programmable Read Only Memory (EEPROM), an Erasable Programmable Read-only Memory (EPROM), a flash memory, a flexible disk, a Compact Disc Read Only Memory (CD-ROM), a Compact Disc Rewritable (CD-RW), a Digital Versatile Disk (DVD), a Secure Digital (SD) card, and a Magneto-Optical Disc (MO) and introduce the data transfer program into the memory 6 or the hard disk 6. Thus, the image forming apparatus 1 is configured as an information processing unit to carry out a data transfer method of effectively carrying out the data transfer while saving the electrical power by controlling the data transfer with the PCI Express at the link width and the operating frequency of the data transfer described below. The data transfer program is executable by a computer which is described by a legacy programming, an object-oriented programming and so on such as an assembler, C, C++, C#, Java (Java is a registered trademark). The data transfer program stored in the recording medium can be distributed.

Figure 2:
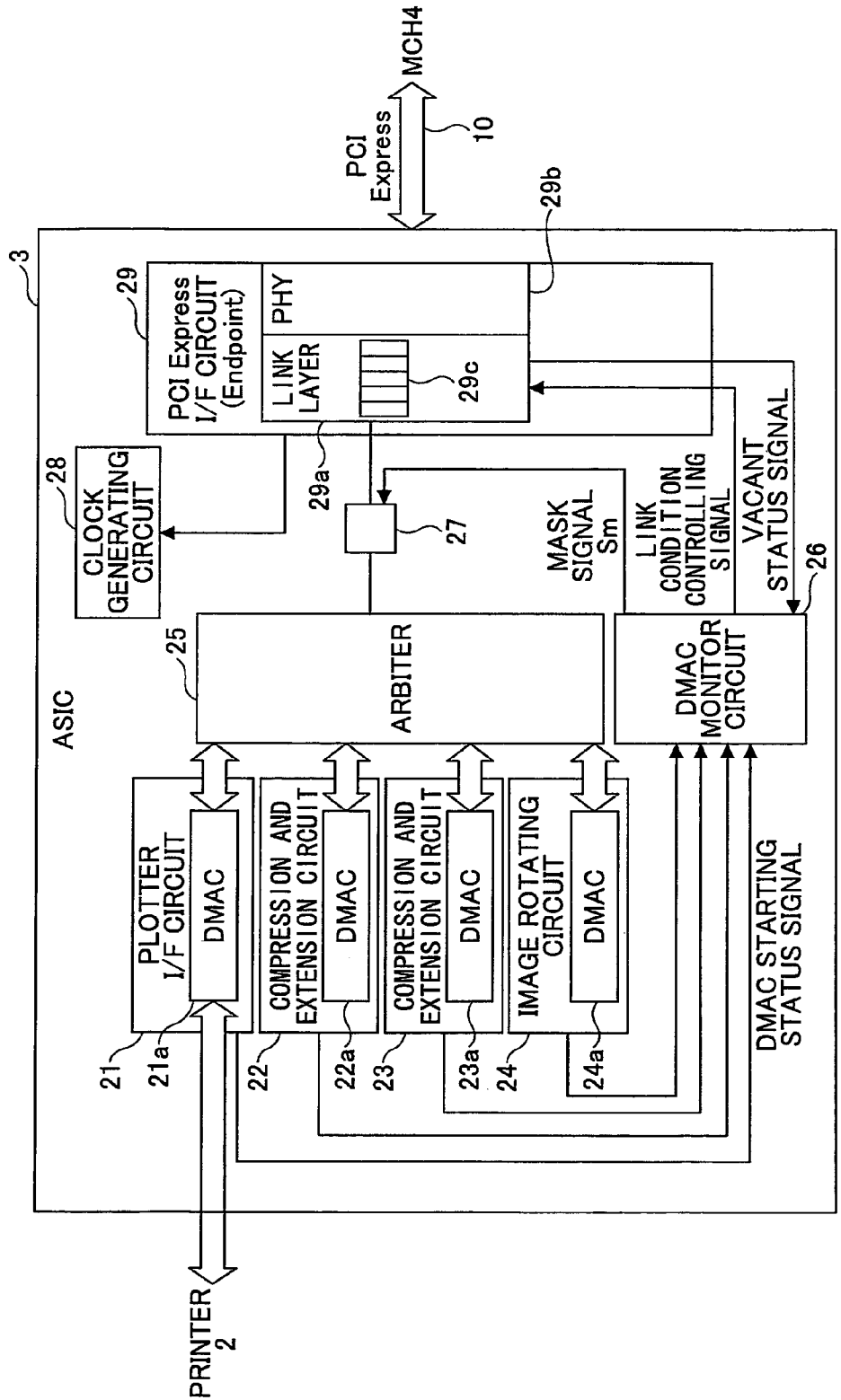
FIG. 2 schematic structure of an example ASIC of the Embodiment.
Figure 3:
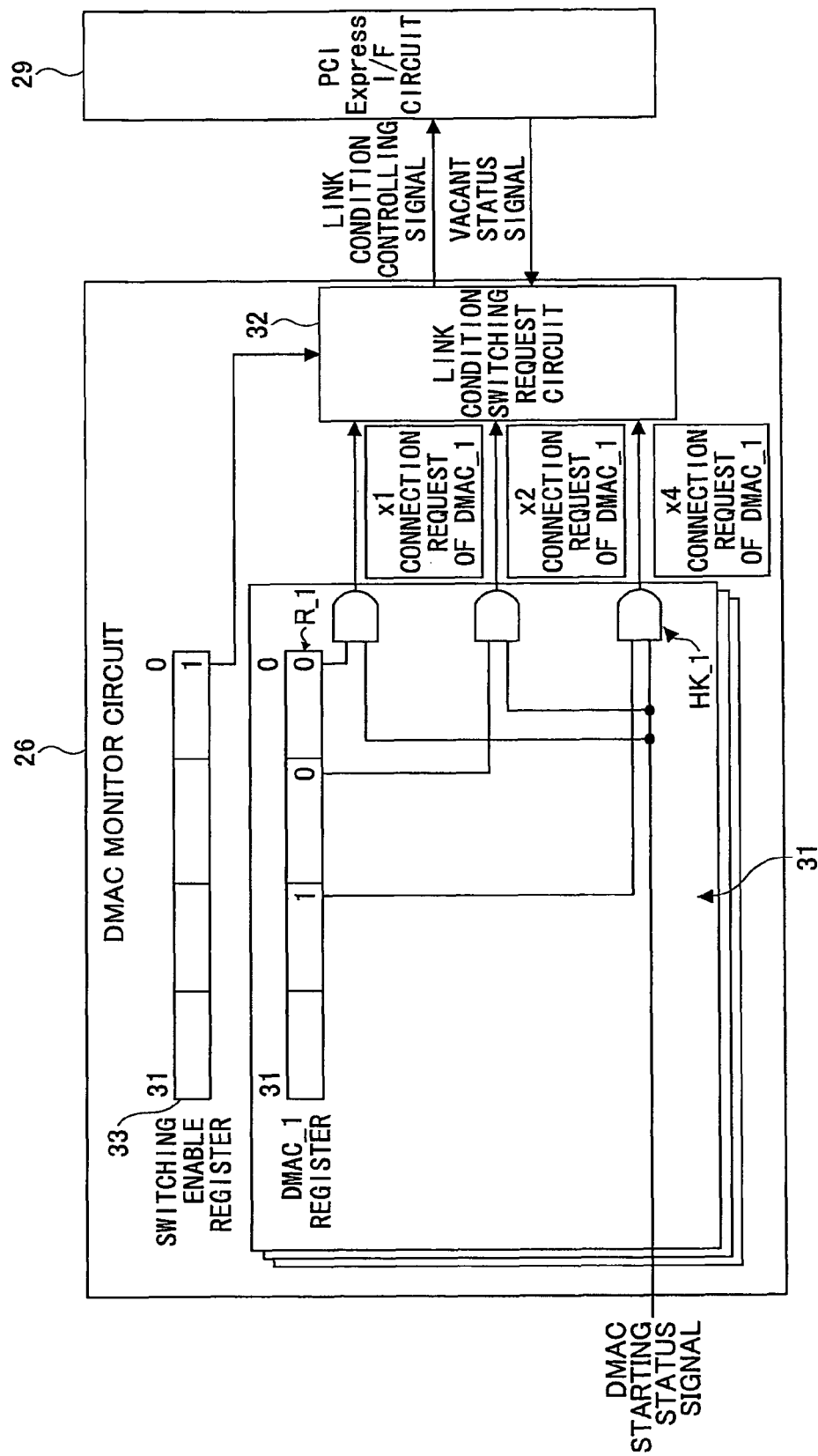
FIG. 3 illustrates a schematic structure of an example DMAC monitor circuit.

Referring to FIG. 2, plural plotter I/F circuits 21, compression and extension circuits 22 and 23, an image rotating circuit 24, an arbiter 25, a Direct Memory Access Controller (DMAC) monitor circuit 26, a request mask circuit 27, a clock generating circuit 28, a PCI Express I/F circuit 29, and so on are installed in the ASIC 3.

The plotter I/F circuit 21 includes the DMAC 21a. The DMAC 21a issues a read request to the arbiter 25 and reads image data on the memory 6 based on a descriptor registered in the memory 6 by the CPU 5. The read image data is transferred to the printer 2 at a predetermined timing by the DMAC 21a.

The compression and extension circuit 22 includes a DMAC 22a, and the compression and extension circuit 23 includes a DMAC 23a. The DMAC 22a and the DMAC 23a issue read requests to the arbiter 25, and the image data on the memory 6 are read based on the descriptor registered in the memory 6 by the CPU 5. The compression and extension circuits 22 and 23 compress the image data read from the memory 6 with a predetermined compression method in order to reduce the capacity of the memory 6. Thereafter, the DMAC 22a and DMAC 23a issue a write request to the arbiter 25 and writes back the compressed image data onto the memory 6 designated by the descriptor. The DMAC 22a and the DMAC 23a of the compression and extension circuits 22 and 23 issue read requests to the arbiter 25 and read the compressed image data on the memory 6 based on the descriptor registered in the memory 6 by the CPU 5. The compression and extension circuit 22 and 23 extend the compressed image data, read from the memory 6. The DMAC 22a and the DMAC 23a issue write requests to the arbiter 25 and write back image data after the extension on the memory 6 designated by the descriptor.

The DMAC 22a and the DMAC 23a of the compression and extension circuits 24 and 24 issue read requests to the arbiter 25 and read the compressed image data on the memory 6 based on the descriptor registered in the memory 6 by the CPU 5. The image rotating circuit 24 rotates the image data read from the memory 6 by an angle designated by the CPU 5. The DMAC 24a issues a write request to the arbiter 25 and writes back the rotated image data in the memory 6 designated by the descriptor.

The arbiter determines an order of processing requests from the DMAC 21a of the plotter I/F circuit 21, the DMAC 22a and the DMAC 23a of the compression and extension circuits 22 and 23, and the DMAC 24a of the image rotating circuit 24 in accordance with a predetermined priority order. The requests to be processed in accordance with the determined order are output to the PCI Express I/F circuit 29 via the request mask circuit 27. In the priority order of the request arbitration, the request from the DMAC 21a of the plotter I/F circuit 21 is given with the first priority in order to avoid abnormal image formation in the printer 2.

The request mask circuit (holding unit) 27 carries out masking and releasing masking of a request receipt signal output to the arbiter 25 with the PCI Express I/F circuit 29 depending on the status of the mask signal Sm of the DMAC monitor circuit 26 described below. The request mask circuit 27 causes the requests from the arbiter 25 to the PCI Express I/F circuit 29 to be newly unaccepted or started to be accepted.

The clock generating circuit (clock generating unit) 28 supplies a conversion clock to the various circuits and components included in the ASIC 3. A clock frequency change condition as a changeable link width for switching the internal clock to generate an ordinary clock frequency and a low clock frequency lower than the ordinary clock frequency is set as an internal clock in an internal register (e.g., frequency change condition setting unit) of the clock generating circuit 28 by software. The ordinary clock width may be 100 MHz and the low clock frequency may be 50 MHz. The link width information is input in the clock generating circuit 28 from the PCI Express I/F circuit 29. The clock generating circuit 28 compares the link width information from the PCI Express I/F circuit 29 with the clock frequency change condition. When the clock width information has the changeable link width of the clock frequency change condition, the clock generating circuit 28 changes a frequency dividing ratio of an external clock to obtain the clock frequency (the low clock frequency) corresponding to the link width of the PCI Express 10, and the converted clock frequency is supplied to various portions of the ASIC 3 as the conversion clock.

The PCI Express I/F circuit 29 (transferring completion reporting unit and switching unit) includes a link layer 29*a* and a physical layer (PHY) 29*b*. A retry buffer 29*c* for storing transmission packets is included in the link layer 29*a*.

The PHY 29*b* includes a driver, an input buffer, a parallel-serial/serial-parallel converter, a phase locked loop (PLL), and a circuit for interface operation such as impedance matching. A logical function is an initialization function of the interface and a maintenance function.

The link layer 29*a* assures data completeness of transaction layer packet (TLP) used for reading/writing in PCI Express and transmitting transactions of various events using error detection and correction (resending) and controls the link. When the link layer 29*a* sends the packets received via the arbiter 25 to the MCH 4 on the receiving side via the PCI Express 10, the link layer 29*a* stores the packets in the retry buffer 29*c* and sequentially send the packets to the MCH 4 on the receiving side via the PCI Express 10. When an acknowledgement (ACK) indicative of normal receipt with the MCH 4 is send from the MCH 4, the retry buffer 29*c* is flushed. For example, if only first three packets are normal and succeeding two packets are abnormal the abnormal packets, a negative acknowledgment (NAK) is transmitted by designating the abnormal packets from the MCH 4 on the receiving side. Therefore, the corresponding packet is taken out of the retry buffer 29*a* and resent to the receiving side.

The PCI Express I/F circuit 29 outputs a vacant status of the retry buffer 29*c* of the link layer 29*a* as a vacant status signal (transfer completion report) to the DMAC monitor circuit 26.

The DMAC monitor circuit 26 includes a link condition requesting circuit 31, a link condition switching request circuit 32, and a switching enable register 33 and so on.

The number of the link condition requesting circuits 31 (a monitoring unit, a use transmission path condition determining unit) is the same as the number of the DMAC 21*a*, the DMAC 22*a*, the DMAC 23*a*, and the DMAC 24*a*, installed in the ASIC 3 (four in FIG. 2). The link condition requesting unit 31 includes the registers R_1 to R_4 for storing a condition of changing the link widths in a case where the number of the DMACs is four and judgment circuits Hk_1 to Hk_4. DMAC starting status signals are input from the corresponding DMAC 21*a* to 24*a* to the judgment circuits Hk of the link condition requesting circuits 31, and register values are input from the corresponding registers R_1 to R_4. The DMAC starting status signals indicate the link width for starting the DMAC 21*a*, the DMAC 22*a*, the DMAC 23*a*, and the DMAC 24*a*.

For example, the judgment circuits Hk of the link condition requesting circuits 31 include three AND circuits. The judgment circuit Hk output a link condition controlling signal to the link condition switching request circuit 32 based on the DMAC starting status signal and the register values of the registers R_1 to R_4.

The switching Enable register (valid/invalid setting unit) 33 has a switching Enable setup value indicative of Permission (Enable) or Prohibition (Disable) of the switching of the link width and the operating frequency during the data transfer of the PCI Express 10 with software. The switching Enable register 33 outputs a switching Enable/Disable signal to the link condition switching request circuit 32 in response to the switching Enable setup value.

When the switching Enable/Disable signal is input from the switching Enable register 33 to permit the switching, the link condition switching request circuit 32 confirms the vacant status signal from the PCI Express I/F circuit 29. When it is confirmed by the vacant status signal that a request corresponding to the content of the retry buffer 29*c* is cleared, a link width and operating frequency control signal for designating the link width and the operating frequency (Data Rate) from the link condition requesting circuit 31 is input in the PCI Express I/F circuit 29.

Register values (transmission path condition including the number of the transmission paths and/or operating frequency of each switching data transfer requesting status) are set in the registers (condition setting unit) R_1 to R_4 as the changeable link condition by software after the PCI Express 10 starts. The registers (condition setting unit) R_1 to R_4 output the set register values to the judgment circuits Hk.

Figure 4:
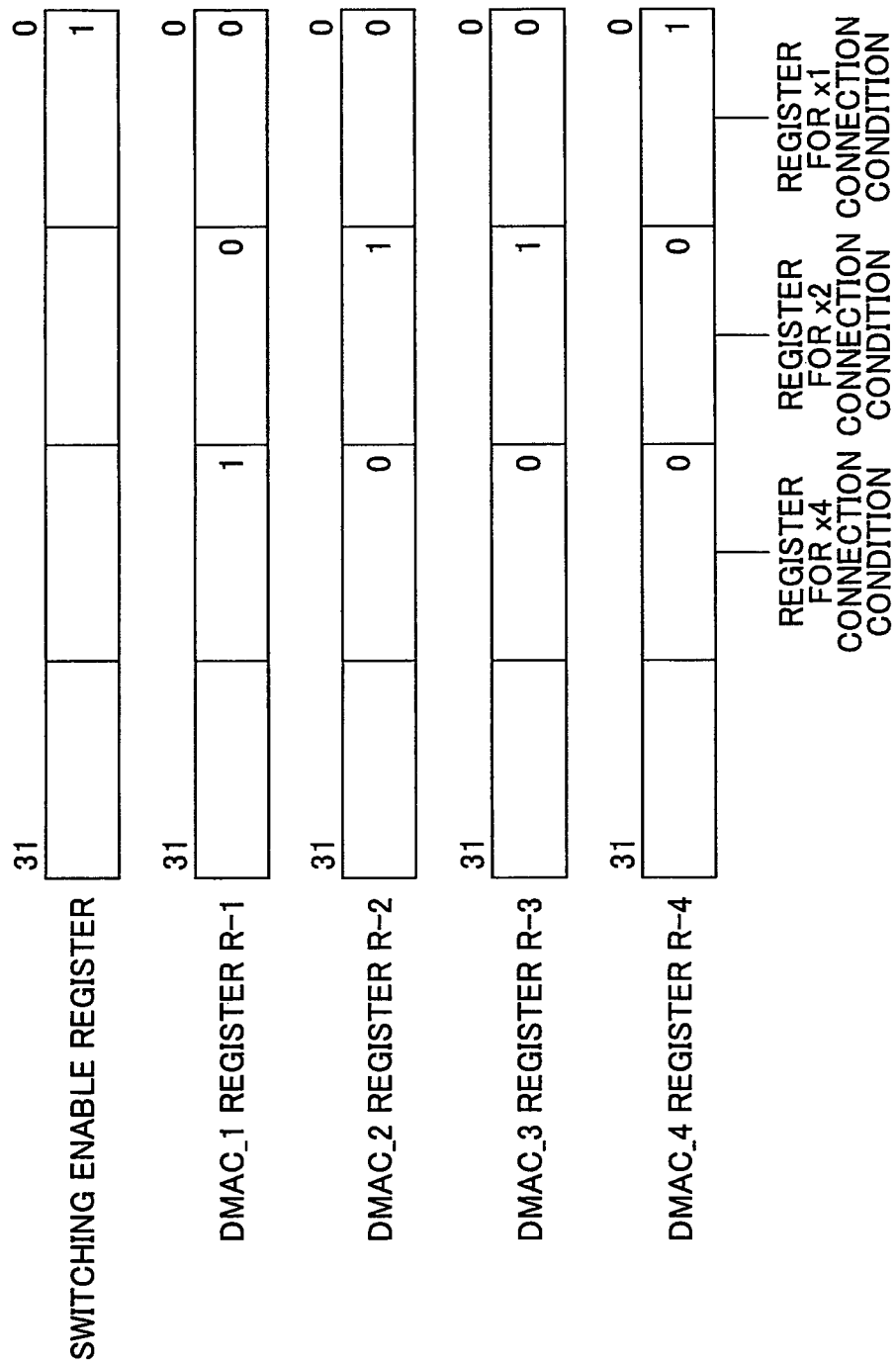
FIG. 4 illustrates example registers of the DMAC monitor circuit.

The register R_1 to the register R_4 of the DMAC monitor circuit correspond to the DMAC 21*a* to the DMAC 24*a*. Referring to FIG. 4, the register R_1 to the register R_4 are connected to the PCI Express I/F circuit 29 with the link widths of ×1, ×2, and ×4 in a case where the PCI Express has four lanes. The PCI Express I/F circuit utilizes plural request statuses as change request statuses (switching data transfer requesting status) for each change request status. The value setting the condition of the operating frequency (hereinafter, referred to a changeable link condition) are set by the software. Referring to FIG. 4, the register R_1 is connected with the link width ×4, the register R_2 and R_3 are connected with the link width ×2, and the register R_4 is connected with the link width ×1. Therefore, corresponding columns for the registers R_1 to R_4 have "1" in FIG. 4.

Referring to FIG. 4, a status in which "1" indicative of permission of switching the link is illustrated in the switching Enable register 33.

The judgment circuit Hk of the link condition requesting circuit 31 receives the changeable link condition from the registers R-1 to R_4, the DMAC starting status signals (request status) from the corresponding DMAC 21*a* to 24*a*, and the vacant status signal of the retry buffer 29*c* from the PCI Express I/F circuit 29. The judgment circuit Hk sets the link width with reference to the changeable link condition and the DMAC starting status signal and determines the required link width from ×1, ×2 and ×4 and the operating frequency as a use link condition (use transmission path condition). When the vacant signal indicates the vacant status of the retry buffer 29*c*, the judgment circuit outputs the link condition controlling signal indicative of the use link condition to the link condition switching request circuit 32, and outputs the mask signal Sm to the request mask circuit 27 as illustrated in FIG. 2. The request mask circuit 27 masks a request receipt signal which is output by the PCI Express I/F circuit 29 to the arbiter 25 and prevent the PCI Express I/F circuit from receiving new request.

When the link condition controlling signal is input from the DMAC monitor circuit 26, the PCI Express I/F circuit switches the link width and the necessary operating frequency of the PCI Express 10 to conform with the link width corresponding to the link condition controlling signal and simultaneously outputs the link width to the clock generating circuit 28.

The clock generating circuit 28 converts a clock supplied from the outside via an external terminal (not illustrated) in conformity with the link width input from the PCI Express I/F circuit 29 and based on the clock frequency change condition set by the software in the internal register. Then, the clock generating circuit 28 supplies the conversion clock to various circuits inside the ASIC 3. Said differently, when the link width of the PCI Express 10 decreases, the frequency band of the PCI Express 10 may become smaller relative to the transfer performance of the DMAC 21a to the DMAC 24a of the ASIC 3. Under the situation, if the operating frequency inside the ASIC 3 is reduced, the ASIC 3 may operate without causing problems in its performance.

With the ASIC 3 of Embodiment 1, software indicating the clock frequency change condition in which the link width and the clock frequency are associated is stored in a built-in register included in the clock generating circuit 28. When information of a current link width is sent from the PCI Express I/F circuit 29 to the clock generating circuit 28, the ASIC 3 refers to the built-in register. The link width corresponds to a lower frequency, a frequency dividing ratio for dividing the frequency of the external clock is changed inside the clock generating circuit 29 to thereby generating the operation clock having the lower operating frequency, whereby the power consumption is reduced.

Next, the operation of Embodiment 1 is described. The image forming apparatus 1 of Embodiment 1 appropriately adjust the link width and the operating frequency of the PCI Express in response to startup statuses of the DMAC 21a to 24a during communication with the PCI Express 10.

Figure 5:
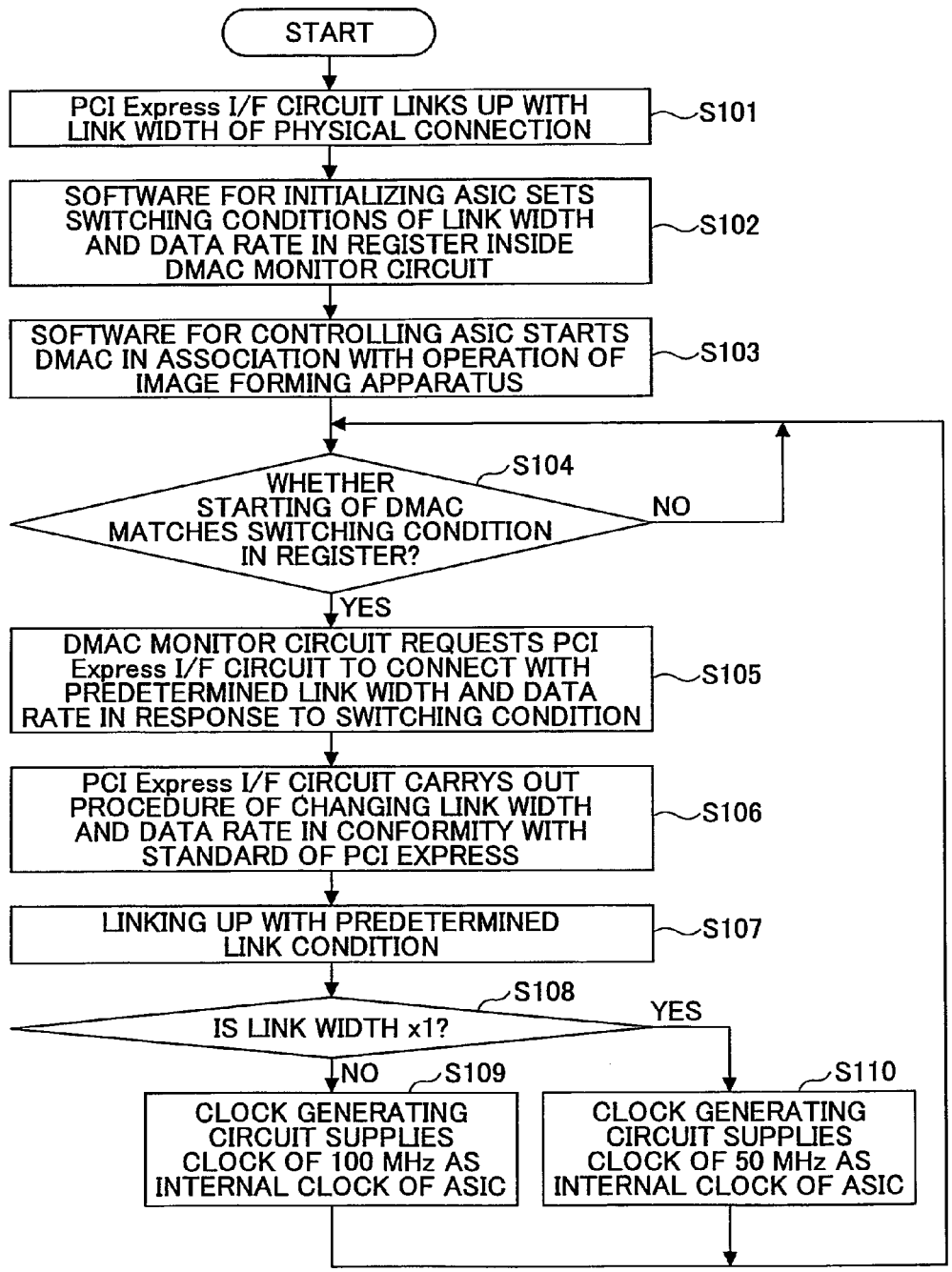
FIG. 5 is an example flowchart illustrating a link condition and clock frequency control process.

Referring to FIG. 5, the image forming apparatus 1 carries out the link width and clock frequency control process for adjusting the link width and the operating frequency of the PCI Express 10 and the clock frequency of the ASIC 3 after starting up the image forming apparatus 1. In the image forming apparatus 1, when the image forming apparatus 1 is powered on, the PCI Express 10 connecting the ASIC 3 to the MCH 4 is physically connected with a link width and the maximum operating frequency without using software in step S101. When the ASIC 3 and the MCH 4 are connected using ×4 (4 lanes), the link-up is also done with ×4. Here, the link-up means that link training of the PCI Express 10 is completed and the link is ready for use.

After the power-on, the ASIC 3 is initialized by software. At this time, software, especially software for initializing the ASIC 3, sets up a switching Enable setup value indicative of permission (Enable) or prohibition (Disable) of the switching of the link width during the data transfer with the PCI Express in the register 33 of the DMAC monitor circuit 26. The software further sets up a changeable link condition to the registers R_1 to R_4 in step S102. The changeable link condition may be a link width of ×1 when the DMAC 21a to DMAC 24a have not started up, a link width of ×4 when image data are transferred to the printer 2 and the frequency band of the PCI Express 10 is required, and an operating frequency of 5.0 GT/s instead of 2.5 GT/s when plural ones of the DMAC 21a to DMAC 24a are simultaneously started up thereby requiring a further wider frequency band. These changeable link condition differ depending on types of image forming apparatuses in which the ASIC 3 is installed because required performances also differ. Therefore, a predetermined setup is done by software depending on the types.

When a time for changing the link width influences transfer of image data, for example, an image becomes abnormal without transferring data of one line within a predetermined period, it is possible to add an operation restriction such that the change request for the link width is masked (held) while the specific DMAC among the DMAC 21a to the DMAC 24a is operating to the link condition.

Next, the user gives a print command to the image forming apparatus 1. Then, the software, especially a software controlling operations of the ASIC 3, starts the DMAC 21a to the DMAC 24a having necessary functions for the print command in step S103. The DMAC monitor circuit 26 monitors a DMAC starting status signal from the DMAC 21a to the DMAC 24a. When there is a change in the DMAC starting status signal, the DMAC monitor circuit 26 monitors compares the changed DMAC starting status signal with the changeable link condition set in the registers R_1 to R_4 to thereby determine whether the DMAC starting status signal satisfies the changeable link condition in step S104.

The DMAC monitor circuit 26 checks whether the DMAC starting status signal from the DMAC 21a to the DMAC 24a satisfies the changeable link condition each predetermined timing when the DMAC starting status signal from the DMAC 21a to the DMAC 24a does not satisfy the link condition in step S104.

When the DMAC starting status signal satisfies the changeable link condition, the DMAC monitor circuit 26 outputs the link condition controlling signal to the link layer 29a of the PCI Express I/F circuit 29 to prompt a connection under a use link condition including a link width corresponding to the changeable link condition and the operating frequency (data rate) in step S105. When the DMAC monitor circuit 26 outputs the link condition controlling signal to the PCI Express I/F circuit 29, the mask signal Sm is output to the request mask circuit 27. When the mask signal Sm is input in the request mask circuit 27, the request mask circuit 27 masks the request receipt signal which is being output to the arbiter 25 by the PCI Express I/F circuit 29 to thereby stop a receipt of a new request in the PCI Express I/F circuit 29. Then, the DMAC monitor circuit 26 monitors the vacant status signal input from the PCI Express I/F circuit 29. When vacant state information shows clearing of the retry buffer 29c, the DMAC monitor circuit 26 gives the link condition controlling signal to the PCI Express I/F circuit 29 to request the PCI Express I/F circuit 29 to change the link condition for connecting with the link width and the operating frequency of the use link condition of the changeable link condition in step S105.

When the request mask circuit 27 preventing the receipt of succeeding request from the arbiter to the PCI Express I/F circuit 29, the PCI Express I/F circuit 29 can quickly switch the frequency band. Further, the vacant status of the retry buffer 29c is monitored to thereby confirm the receipt of all requests from the ASIC 3 to the MCH 4, said differently, ACK DLLP packets indicative of the receipt by the MCH are received and the corresponding request inside the retry buffer 29c is cleared, and the receipt of a response packet (Completion) from the MCH 4 for the issued read request. Thus, the switching is carried out for the issued requests after confirming that all issued requests are completely transferred. Therefore, it is possible to avoid functional failures of stopping functional modules such as the plotter I/F circuit 21, the compression and extension circuits 22 and 23, and the image rotating circuit 24 with this waiting for Completion even if there is an inaccessible time (several seconds) during the switching operation.

When the PCI Express I/F circuit 29 receives the link condition controlling signal being a request for changing the link condition, the PCI Express I/F circuit 29 carries out a change process the link condition to the use link condition which includes the link width and the data rate and designated by the link condition controlling signal in conformity with the process defined by the standard of the PCI Express in step S106. Thus, the PCI Express I/F circuit 29 is linked up with the link condition including the link width and the operating frequency in step S107.

The PCI Express I/F circuit 29 outputs the changed link width information to the clock generating circuit 28. The clock generating circuit 28 checks whether the changed link width has the predetermined link width (e.g., link width ×1) set in the register in step S108.

When the link width does not have a predetermined value in step S108, the clock generating circuit 28 switches the clock frequency to an ordinary clock frequency, e.g., 100 MHz, and supplies the clock frequency as the internal clock of the ASIC 3 in step S109. Then, the process returns back to step S104 so that the DMAC starting status signal is monitored, and the similar processes to steps S104 to S109 are carried out. When the link width has a predetermined value, it is determined that the clock frequency of the ASIC 3 is determined to be switched (decreased). Therefore, the switched clock frequency lower than the ordinary clock frequency is supplied to the ASIC 3 in step S110. Then, the process returns back to step S104 so that the DMAC starting status signal is monitored, and the similar processes to steps S104 to S109 are carried out. Said differently, when the link width of the PCI Express 10 decreases, the frequency band of the PCI Express 10 may become smaller relative to the transfer performance of the DMAC 21*a* to the DMAC 24*a* of the ASIC 3. Under the situation, if the operating frequency inside the ASIC 3 is reduced, the image forming apparatus may operate without causing problem in its performance.

In the above description, both the link width and the operating frequency of the PCI Express I/F circuit 29 are adjusted. However, only one of the link width and the operating frequency may be adjusted.

As described, the ASIC 3 of the image forming apparatus 1 includes the PCI Express I/F circuit 29 (serial interface) connected to plural transmission path and transferring data at plural operating frequencies. When the DMAC 21*a* to the DMAC 24*a* of the ASIC 3 issue requests of transferring data, the ASIC 3 associates statuses of the requests of transferring data with change request statuses (switching data transfer requesting status). At least one of the link width (the number of transmission paths) and the operating frequency is set as the changeable link condition (set transmission path condition) to the registers R_1 to R_4 of the DMAC monitor circuit 26. The DMAC monitor circuit 26 monitors the requests of the DMAC 21*a* to the DMAC 24*a* to the PCI Express I/F circuit, a request status obtained by monitoring the requests is compared with the change request statuses of the registers R_1 to R_4. When the request status corresponds to the change request status, the changeable link condition corresponding to the change request status is determined as the use link condition. Then, the PCI Express I/F circuit 29 switches at least one of the link width and the operating frequency to the link width and the operating frequency of the use link condition.

Therefore, the link width and the operating frequency of the PCI Express I/F circuit 29 can be controlled in response to the operating statuses of the various circuits 21 to 24 included in the ASIC 3. It is possible to quickly adjust the link width and the operating frequency of the transmission path to be suitable for the request status during the data transfer.

Further, in the ASIC 3 of the image forming apparatus 1 of Embodiment 1, the DMAC monitor circuit 26 determines the use link condition and thereafter the link width and the operating frequency of the PCI Express I/F circuit 29 are switched. While the DMAC monitor circuit 26 determines the use link condition and thereafter the link width and the operating frequency of the PCI Express I/F circuit 29 are switched, requests issued from the DMAC 21*a* to the DMAC 24*a* to the PCI Express I/F circuit 29 is held (suspended) by the request mask circuit 27.

Therefore, it is possible to properly switch the link width and the operating frequency in the PCI Express I/F circuit 29, and the data transfer can be started immediately after the switching. Thus, power consumption can be reduced and availability of the ASIC 3 can be improved.

Further, in the ASIC 3 of the image forming apparatus 1 of Embodiment 1, the link layer 29*a* of the PCI Express I/F circuit 29 issues the vacant status signal (transfer completion report) when the data related to the requests received from the DMAC 21*a* to the DMAC 24*a* are completely transferred. When the change request status corresponding to the request statuses of the DMAC 21*a* to the DMAC 24*a* is set in the registers R_1 to R_4, the link condition controlling signal is output to the PCI Express I/F circuit 29 after waiting for the issuance of the vacant status signal, which corresponds to the request already received by PCI Express I/F circuit 29*c* from the DMAC 21*a* to the DMAC 24*a* and issued from the link layer 29*c*.

Therefore, after the request processed in the PCI Express I/F circuit 29 is completely processed, it is possible to immediately switch the link width and the operating frequency. Therefore, transitions to the power consumption mode can be done on a case-by-case basis thereby further reducing the power consumption.

Further, the ASIC 3 of the image forming apparatus 1 generates the clock used inside the ASIC 3 in the clock generating circuit 29 using the external block, and the clock frequency is changed based on the link width information from the PCI Express I/F circuit 29.

Therefore, when the link width of the PCI Express 10 reduces and the frequency band of the PCI Express 10 becomes smaller than the transfer performance of the DMAC 21*a* to the DMAC 24*a*, there may be no problem in reducing the operating frequency inside the ASIC 3. In this case, by reducing the operating frequency inside the ASIC 3, the operation of the ASIC 3 can be properly maintained, and the power consumption can be further reduced.

Further, in the ASIC 3 of the image forming apparatus 1 of Embodiment 1, the clock generating circuit 28 includes the register (frequency change condition setting unit) in which the clock frequency change condition by which the link width and the clock frequency are associated. The clock frequency is determined by comparing the clock frequency change condition with the link width input from the PCI Express I/F circuit 29.

Therefore, it is possible to properly generate the clock frequency in response to the type, performance, or the like of the image processing unit such as the image forming apparatus 1 to which the ASIC being a semiconductor integrated circuit 3 is applicable. Thus, it is possible to further enhance the availability and reduce the power consumption.

Further, the DMAC monitor circuit 26 of the ASIC 3 of the image forming apparatus 1 includes a switching enable register 33 in which the switching Enable setup value indicative of permission (Enable) or prohibition (Disable) to the switching of the link width and the operating frequency during the data transfer of the PCI Express.

Therefore, in response to the performance, aim, or the like of the image processing apparatus such as the image forming apparatus 1 to which the ASIC 3 is applied, it is possible to select whether the link width and the operating frequency of the PCI Express I/F circuit 29 is changed. Thus, the availability can be enhanced and the power consumption can be reduced.

Further, the ASIC 3 of the image forming apparatus 1 includes the PCI Express I/F circuit 29 as the serial interface.

Therefore, a high speed data transfer can be carried out using the PCI Express 20, and the PCI Express I/F circuit 29 can be operated at the minimum necessary link width and operating frequency in the interface connection with the PCI Express 10. Although the PCI Express 10 which ordinarily causes a large power consumption, the power consumption in the PCI Express can be reduced.

Embodiment 2

According to Embodiment 2, there is provided a data transfer method.

The data transfer method includes a transfer requesting step of processing a predetermined number of data transfer requests to a serial interface which is connected to plural transmission paths and carries out data transfer operations with plural operating frequencies.

The data transfer method further includes a request monitoring step of monitoring the data transfer request to the serial interface in the transfer requesting step.

The data transfer method further includes a condition setting step of setting a set transmission path condition including at least one of a number of the transmission paths and an operating frequency to be used under statuses of the plural data transfer requests, the set transmission path condition being obtained by associating the plural data transfer requests with status of a switching data transfer request.

The data transfer method further includes a use transmission path condition determining step of determining the set transmission path condition corresponding to the status of the switching data transfer request as a use transmission path condition when the status of the switching data transfer request corresponds to the status of the data transfer request by comparing the status of the data transfer request obtained in the request monitoring step with the status of the switching data transfer request obtained in the condition setting step.

The data transfer method further includes a switching step of switching at least one of the number of the transmission paths and the operating frequency of the serial interface to the use transmission path condition determined in the use transmission path condition determining step.

According to Embodiment 2, it is possible to quickly adjust the link width and the operating frequency to be a link width and an operating frequency suitable for the data transfer request.

The present invention may be applicable to a data transfer device including a semiconductor integrated circuit and a serial interface connected to a bus such as the PCI Express with plural link widths and plural operating frequencies, an image processing apparatus including the data transfer device, a data transfer method using the data transfer device, a data transfer program for the data transfer device, and a recording medium having the data transfer program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-052959 filed on Mar. 10, 2010, the entire contents of which are hereby incorporated herein by reference.

What is claimed is:

1. A data transfer device comprising:
a serial interface configured to include a plurality of transmission paths and carry out a data transfer operation based on a plurality of operating frequencies;
a plurality of transfer requesting units configured to issue a plurality of data transfer requests to the serial interface, the serial interface including a transfer completion report unit configured to issue a transfer completion report after data requested in the plurality of data transfer requests received from the transfer requesting unit are completely transferred;
a request monitoring unit configured to monitor the plurality of data transfer requests from the plurality of transfer requesting units to the serial interface;
a condition setting unit configured to set a set transmission path condition including at least one of a number of the plurality of transmission paths and an operating frequency of the serial interface, the set transmission path condition being used, when the plurality of data transfer requests are issued, in order to switch statuses of the data transfer requests to statuses of switching data transfer requests;
a use transmission path condition determining unit configured to determine the set transmission path condition corresponding to at least one of the statuses of the switching data transfer requests as a use transmission path condition when the at least one status of the switching data transfer requests corresponds to at least one of the statuses of the data transfer requests, the correspondence between the at least one status of switching data transfer requests and the at least one status of the data transfer requests being determined by comparing the at least one status of the data transfer requests with the statuses of the switching data transfer requests; and
a switching unit configured to switch at least one of the number of the transmission paths and the operating frequency of the serial interface to the use transmission path condition determined by the use transmission path condition determining unit, the use transmission path condition determining unit further configured to send the use transmission path condition to the switching unit after the transfer completion report corresponding to the plurality of data transfer requests received by the serial interface is issued by the transfer completion report unit when the at least one status of the switching data transfer requests corresponds to the at least one status of the data transfer requests obtained by the request monitoring unit.

2. The data transfer device according to claim 1, further comprising:
a holding unit configured to prevent the data transfer requests from reaching the serial interface by holding the data transfer requests until the use transmission path condition determining unit determines the use transmission path condition and the switching unit completely switches at least one of the number of the transmission paths and the operating frequency of the serial interface to the use transmission path condition.

3. The data transfer device according to claim 1, further comprising:
a clock generating unit configured to,
generate a clock used inside the data transfer device, and
change a frequency of the clock based on the number of the transmission paths determined by the use transmission path condition determining unit.

4. The data transfer device according to claim 3, wherein the clock generating unit,
includes a frequency change condition setting unit in which a clock frequency change condition associating the number of the transmission paths with the frequency of the clock is set, and
determines the frequency of the clock based on the clock frequency change condition and the number of the transmission paths determined by the use transmission path condition determining unit.

5. The data transfer device according to claim 1, further comprising:
a valid/invalid setting unit configured to set validity or invalidity of at least one of the transmission paths and the operating frequency of the serial interface.

6. The data transfer device according to claim 1, wherein the serial interface is an interface of PCI Express.

7. An image processing apparatus comprising:
a data processing device configured to process image data transferred to the data processing device; and
a data transfer device for configured to transfer the image data to the data processing device, the data transfer device including:
a serial interface configured to include a plurality of transmission paths and carry out a data transfer operation based on a plurality of operating frequencies,
a plurality of transfer requesting units configured to issue a plurality of data transfer requests to a serial interface, the serial interface including a transfer completion report unit configured to issue a transfer completion report after data requested in the plurality of data transfer request received from the transfer requesting unit are completely transferred,
a request monitoring unit configured to monitor the plurality of data transfer requests from the plurality of transfer requesting units to the serial interface,
a condition setting unit configured to set a set transmission path condition including at least one of a number of the plurality of transmission paths and an operating frequency of the serial interface, the set transmission path condition being used, when the plurality of data transfer requests are issued, in order to switch statuses of the data transfer requests to statuses of switching data transfer requests;
a use transmission path condition determining unit configured to determine the set transmission path condition corresponding to at least one of the statuses of the switching data transfer requests as a use transmission path condition, when the at least one status of the switching data transfer requests corresponds to at least one of the statuses of the data transfer requests, the correspondence between the at least one status of switching data transfer requests and the at least one status of the data transfer requests being determined by comparing the at least one status of the data transfer requests with the statuses of the switching data transfer requests, and
a switching unit configured to switch at least one of the number of the transmission paths and the operating frequency of the serial interface to the use transmission path condition determined by the use transmission path condition determining unit, the use transmission path condition determining unit further configured to send the use transmission path condition to the switching unit after the transfer completion report corresponding to the plurality of data transfer requests received by the serial interface is issued by the transfer completion report unit when the at least one status of the switching data transfer requests corresponds to the at least one status of the data transfer requests obtained by the request monitoring unit.

8. A non-transitory recording medium including a program comprising a sequence of instructions, which when executed by a computer, included in a data transfer device including a serial interface connected to a plurality of transmission paths, causes the computer to perform functions, including:
processing a plurality of data transfer requests to the serial interface and carrying out data transfer operations with a plurality of operating frequencies;
issuing a transfer completion report after data requested in the plurality of data transfer requests are completely transferred;
monitoring the plurality of data transfer requests to the serial interface in the processing;
setting a set transmission path condition including at least one of a number of the transmission paths and an operating frequency, the set transmission path condition being used, when the plurality of data transfer requests are issued, in order to switch statuses of the data transfer requests to statuses of switching data transfer requests;
determining the set transmission path condition corresponding to at least one of the statuses of the switching data transfer requests as a use transmission path condition, when the at least one status of the switching data transfer requests corresponds to at least one of the statuses of the data transfer requests, the correspondence between the at least one status of the switching data transfer requests and the at least one status of the data transfer requests being determined by comparing the at least one status of the data transfer requests with the statuses of the switching data transfer requests;
switching at least one of the number of the transmission paths and the operating frequency of the serial interface to the use transmission path condition determined based on the determining; and
sending the use transmission path condition to a switching unit after the transfer completion report corresponding to the plurality of data transfer requests received by the serial interface is issued when the at least one status of the switching data transfer requests corresponds to the at least one status of the data transfer requests obtained based on the monitoring.

* * * * *